United States Patent
Hatano et al.

(10) Patent No.: US 10,544,490 B2
(45) Date of Patent: Jan. 28, 2020

(54) FERRITIC STAINLESS STEEL FOR FUEL CELL AND METHOD FOR PRODUCING THE SAME

(71) Applicant: NIPPON STEEL & SUMIKIN STAINLESS STEEL CORPORATION, Tokyo (JP)

(72) Inventors: Masaharu Hatano, Hikari (JP); Atsutaka Hayashi, Hikari (JP); Kazuhisa Matsumoto, Hikari (JP)

(73) Assignee: NIPPON STEEL & SUMIKIN STAINLESS STEEL CORPORATION, Tokyo (JP)

( * ) Notice: Subject to any disclaimer, the term of this patent is extended or adjusted under 35 U.S.C. 154(b) by 384 days.

(21) Appl. No.: 15/329,518

(22) PCT Filed: Jul. 29, 2015

(86) PCT No.: PCT/JP2015/071502
§ 371 (c)(1),
(2) Date: Jan. 26, 2017

(87) PCT Pub. No.: WO2016/017692
PCT Pub. Date: Feb. 4, 2016

(65) Prior Publication Data
US 2017/0321310 A1    Nov. 9, 2017

(30) Foreign Application Priority Data

Jul. 29, 2014 (JP) .................. 2014-154022
Jul. 29, 2014 (JP) .................. 2014-154023

(51) Int. Cl.
C22C 38/38    (2006.01)
C21D 1/76    (2006.01)
(Continued)

(52) U.S. Cl.
CPC ................ C22C 38/38 (2013.01); C21D 1/76 (2013.01); C21D 6/00 (2013.01); C21D 6/002 (2013.01);
(Continued)

(58) Field of Classification Search
CPC . C21D 1/76; C21D 6/00; C21D 6/002; C21D 9/46; C22C 38/00; C22C 38/06; H01M 8/06; H01M 8/12
(Continued)

(56) References Cited

U.S. PATENT DOCUMENTS 5,944,917 A     8/1999 Takeda et al.
9,837,567 B2 *  12/2017 Hatano ............. H01L 31/03923
(Continued)

FOREIGN PATENT DOCUMENTS

JP    8-41596 A    2/1996
JP    3886785 B2    2/2007
(Continued)

OTHER PUBLICATIONS

International Search Report for PCT/JP2015/071502 (PCT/ISA/210) dated Oct. 27, 2015.
(Continued)

*Primary Examiner* — Jie Yang
(74) *Attorney, Agent, or Firm* — Birch, Stewart, Kolasch & Birch, LLP (57) ABSTRACT

A ferritic stainless steel for a fuel cell includes, in mass %, Cr: 11 to 25%, C: 0.03% or less, Si: 2% or less, Mn: 2% or less, Al: 0.5 to 4.0%, P: 0.05% or less, S: 0.01% or less, N: 0.03% or less, Ti: 1% or less, and a balance composed of Fe and unavoidable impurities. Furthermore, in the ferritic stainless steel, the maximal concentration of Al in a surface of the ferritic stainless steel is 30 mass % or more in cation
(Continued)

ion fraction excepting O in an depth direction region having twice a thickness of an oxide film having less than 0.1 μm.

8 Claims, 2 Drawing Sheets

(51) Int. Cl.
| | |
|---|---|
| *H01M 8/06* | (2016.01) |
| *H01M 8/12* | (2016.01) |
| *C21D 6/00* | (2006.01) |
| *C22C 38/60* | (2006.01) |
| *C22C 38/00* | (2006.01) |
| *C22C 38/22* | (2006.01) |
| *C22C 38/20* | (2006.01) |
| *C22C 38/24* | (2006.01) |
| *C22C 38/18* | (2006.01) |
| *C22C 38/04* | (2006.01) |
| *C22C 38/14* | (2006.01) |
| *C22C 38/12* | (2006.01) |
| *C21D 9/46* | (2006.01) |
| *C22C 38/02* | (2006.01) |
| *C22C 38/06* | (2006.01) |
| *C22C 38/28* | (2006.01) |

(52) U.S. Cl.
CPC ............... *C21D 9/46* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/12* (2013.01); *C22C 38/14* (2013.01); *C22C 38/18* (2013.01); *C22C 38/20* (2013.01); *C22C 38/22* (2013.01); *C22C 38/24* (2013.01); *C22C 38/28* (2013.01); *C22C 38/60* (2013.01); *H01M 8/06* (2013.01); *H01M 8/12* (2013.01)

(58) Field of Classification Search
USPC ......................................................... 148/325
See application file for complete search history.

(56) References Cited

U.S. PATENT DOCUMENTS

| | | |
|---|---|---|
| 2013/0319583 A1 | 12/2013 | Hatano et al. |
| 2014/0241931 A1 | 8/2014 | Nakamura et al. |

FOREIGN PATENT DOCUMENTS

| | | | |
|---|---|---|---|
| JP | 3910419 B2 | | 4/2007 |
| JP | 2008-101240 A | | 5/2008 |
| JP | 2008-156692 A | | 7/2008 |
| JP | 2009167443 A | * | 7/2009 |
| JP | 2010-47791 A | | 3/2010 |
| JP | 2010-222638 A | | 10/2010 |
| JP | 2010-236012 A | | 10/2010 |
| JP | 2011-162863 A | | 8/2011 |
| JP | 2012-12674 A | | 1/2012 |
| JP | 2013-100595 A | | 5/2013 |
| JP | 5401039 B2 | | 1/2014 |
| JP | 2014-77175 A | | 5/2014 |

OTHER PUBLICATIONS

Written Opinion of the International Searching Authority for PCT/JP2015/071502 (PCT/ISA/237) dated Oct. 27, 2015.
Extended European Search Report for counterpart Application No. 15827706.1, dated Feb. 2, 2018.

* cited by examiner

FERRITIC STAINLESS STEEL FOR FUEL CELL AND METHOD FOR PRODUCING THE SAME

TECHNICAL FIELD

The present invention relates to a ferritic stainless steel for a fuel cell, and a method for producing the same. Particularly, the present invention relates to a ferritic stainless steel which is suitable for use in a fuel cell high temperature member such as a reformer or a heat exchanger used to reform a hydrocarbon fuel such as a city gas (utility gas), methane, natural gas, propane, lamp oil, and gasoline to hydrogen, and a method for producing the same. Especially, the ferritic stainless steel for the fuel cell of the present invention is suitable for use in a high temperature member of a solid oxide fuel cell (SOFC) which requires a surface of the stainless steel to have a reaction property that inhibits Cr vaporization in an oxidizing environment containing a reformed gas environment.

Priority is claimed on Japanese Patent Application No. 2014-154022, filed Jul. 29, 2014, and Japanese Patent Application No. 2014-154023, filed Jul. 29, 2014, the content of which is incorporated herein by reference.

BACKGROUND ART

In recent years, since there are problems of a depletion of fossil fuels such as petroleum and global warming caused by carbon dioxide emissions, popularization of new systems as an alternative to a conventional power generation system has accelerated. As one of the new systems, fuel cells have received attention, since they are very practical as dispersed power sources and power sources of vehicles. There are several types of fuel cells, especially, a polymer electrolyte fuel cell (PEFC) and a solid oxide fuel cell (SOFC) have high energy efficiency, and are expected to increase in popularity in the future.

The fuel cell is an apparatus for generating power by performing a reaction process that is opposite to that performed during electrolysis of water, and in which hydrogen is used. Hydrogen is produced by reforming a hydrocarbon fuel such as a city gas (LNG), methane, natural gas, propane, lamp oil, and gasoline in the presence of a catalyst. Especially, the fuel cell using the city gas as a raw fuel have advantages of being able to produce hydrogen in an area improved utility piping.

A fuel reforming reactor is commonly operated at a high temperature in a range of 200° C. to 900° C., in order to secure the amount of heat required for the hydrogen reforming reaction. Further, the fuel reforming reactor is subjected to an oxidizing atmosphere including a lot of water vapor, carbon dioxide, carbon monoxide, and the like, in the high temperature condition, and a heating-cooling cycle is repeated by a start-and-stop control depending on hydrogen demand. Austenitic stainless steels represented by SUS310S (25Cr-20Ni) has been used as a practical material having sufficient durability under the above hard conditions. A cost reduction of the fuel cell system is required to expand the popularization of the fuel cell system, and it is necessary to reduce the alloy cost according to optimizations of raw materials.

Further, in the SOFC system, it is necessary to prevent a ceramic electrode from being poisoned from Cr vaporization at the SOFC operating temperature, while the stainless steel containing high levels of Cr is used in the SOFC system. $CrO_3$ (g) having a high vapor pressure is generated from $Cr_2O_3$ (s) formed on a surface of the stainless steel, based on reactions represented by following formulas (1) and (2); the ceramic electrode is subjected to vapor-phase diffusion of $CrO_3$ (g) and $Cr_2O_3$ (s) is deposited onto the ceramic electrode, thereby the ceramic electrode is poisoned from the Cr vaporization. $e^-$ is transferred to the ceramic electrode under ordinary circumstances, but when $e^-$ is used as shown in the formula (2), $Cr_2O_3$ (s) is deposited onto the ceramic electrode, and as a result, the internal resistance of the fuel cell increases and the power generation efficiency decreases.

$$\tfrac{1}{2}Cr_2O_3(s)+\tfrac{3}{4}O_2(g)=CrO_3(g) \qquad (1)$$

$$CrO_3(g)+3e^-=\tfrac{1}{2}Cr_2O_3(s)+\tfrac{3}{2}O^{2-} \qquad (2)$$

Note: (s): solid, (g): gas, and $e^-$: electron.

From the above-described circumstances, in order to ensure good oxidation resistance and suppress Cr vaporization, the use of a ferritic stainless steel containing Al is recommended. In Patent Document 1, a ferritic stainless steel for a reformer of reforming petroleum fuel is disclosed, and the ferritic stainless steel is prepared by including Cr: 8 to 35%, C: 0.03% or less, N: 0.03% or less, and Mn: 1.5% or less; Si: 0.8 to 2.5% and/or Al 0.6 to 6.0%, and one or two or more elements selected from a group consisting of Nb: 0.05 to 0.80%, Ti: 0.03 to 0.50%, Mo: 0.1 to 4%, Cu:0.1 to 4%, wherein the total amount of Si and Al is 1.5% or more. In the above stainless steel, the increase in the amount of oxidation during heating at 900° C. and cooling in atmosphere of 50 vol % of $H_2O$+20 vol % of $CO_2$ is small.

The ferritic stainless steel used in a reforming reactor for reforming alcohol fuel is disclosed in Patent Document 2, and the ferritic stainless steel includes Cr: 8 to 25%, C: 0.03% or less, N: 0.03% or less, Si: 0.1 to 2.5%, Mn: 1.5% or less, Al: 0.1 to 4%, and one or two or more elements selected from a group consisting of Nb: 0.05 to 0.80%, Ti: 0.03 to 0.5%, Mo: 0.1 to 4%, and Cu: 0.1 to 4%. In the above stainless steel, the increase in the amount of oxidization is 2.0 mg/cm² or less, after heating at 600° C. and cooling were cycled repeatedly in 500 times in an atmosphere of 50 vol % of $H_2O$+20 vol % of $CO_2$.

A ferritic stainless steel which is preferable for use in a power-generating system is disclosed in Patent Document 3, the ferritic stainless steel includes Cr: 11 to 22%, C: 0.03% or less, N: 0.03% or less, Si: 2% or less, Mn: 1.5% or less, and Al: 1 to 6%, and a total amount of Cr, Si, and Al satisfies Cr+5Si+6Al≥30. The above stainless steel has good oxidation resistance at a temperature of 700° C. or 800° C. and an atmosphere of 50 vol % of $H_2O$ (and a balance of air), and an Al oxidation layer containing 5 mass % or less of Cr is formed thereon, and an Al absence layer is formed on an inside surface of the Al oxidation layer, thereby preventing Cr vaporization.

A ferritic stainless steel which is preferable for use in a high temperature reforming apparatus of a fuel cell is disclosed in Patent Document 4, the ferritic stainless steel includes Cr: 11 to 21%, C: 0.03% or less, N: 0.03% or less, Si: 3% or less, Mn: 1.0% or less, Al: 6% or less, Cu: 0.01 to 0.5%, Mo: 0.01 to 0.5%, Nb: 0.1% or less, Ti: 0.005 to 0.5%, Sn: 0.001 to 0.1%, O: 0.002% or less, H: 0.00005% or less, and Pb: 0.01% or less. The above stainless steel has a good oxidation resistance at a temperature of 1200° C. in an atmosphere of 10 vol % of $H_2O$ (and a balance of air).

A ferritic stainless steel containing Al which is used for a fuel cell is disclosed in Patent Document 5, the e ferritic stainless steel includes Cr: 13 to 20%, C: less than 0.02%, N: 0.02% or less, Si: more than 0.15 to 0.7%, Mn: 0.3% or less, Al: 1.5 to 6%, Ti: 0.03 to 0.5%, Nb: 0.6% or less, and amounts of Ti solid solution and Nb solid solution are controlled to improve oxidation resistance and creep fracture lifetime. The above stainless steel has good oxidation resistance in an accelerated oxidation test at a temperature of 1050° C. in air.

The ferritic stainless steel disclosed in Patent Documents 1 and 2 indicate improvements of the oxidation resistance under the atmosphere of 50 vol % of $H_2O$+20 vol % of $CO_2$. In the former, the technological thought is that properties of a Cr oxide film are improved by a combined addition of Si+Al>1.8% while in the latter, the technological thought is that the properties of an Al oxide film and a Cr oxide film are improved by a combined addition of Si+Al. However, when the Cr oxide film is formed on the ferritic stainless steel, it is difficult to avoid vaporization Cr as described above in formulas (1) and (2).

The ferritic stainless steel disclosed in Patent Document 3 indicates improvements of the oxidation resistance under atmosphere of 50 vol % of $H_2O$ (and a balance of air), the technological thought is that the Al oxidation layer containing 5 mass % or less of Cr is formed by a combined addition of Si+Al, and an Al absence layer is formed in an inside surface of the Al oxidation layer, thereby preventing Cr vaporization. Preliminary oxidation conditions for forming the Al oxidation layer is at a temperature of 800 to 1100° C. in an atmosphere consisting of a mixture of air and carbon dioxide having a dew point of 20° C., in 10 minutes or less.

The ferritic stainless steel disclosed in Patent Document 4 is limited to a 18Cr-1.9 to 3.3Al in which B is not added and Sn is added as an essential element. In the ferritic stainless steel disclosed in Patent Document 5, the oxidation resistance of the Al oxidation layer is improved by reducing generation of Ti oxide during the accelerated oxidation at a temperature of 1050° C. by reducing the amount of Ti solid solution, and the creep fracture lifetime is improved by ensuring the adequate amount of Nb solid solution by adding Nb. That is, the generation of the Ti oxide is reduced under the above technological thought.

PRIOR ART LITERATURE

Patent Documents

Patent Document 1: Japanese Patent Granted Publication No. 3886785
Patent Document 2: Japanese Patent Granted Publication No. 3910419
Patent Document 3: Japanese Patent Granted Publication No. 5401039
Patent Document 4: Japanese Unexamined Patent Application, First Publication No. 2012-12674
Patent Document 5: Japanese Unexamined Patent Application, First Publication No. 2010-222638

DISCLOSURE OF INVENTION

Problems to be Solved by the Invention

The reforming gas of the fuel cell using the city gas as the raw fuel includes water vapor/carbon dioxide/carbon monoxide and a lot of hydrogen, an oxidation property of the prior ferritic stainless steels under this reforming gas is not known. The SOFC system is expected to expand the popularization in future; however, it is necessary to prevent the ceramic electrode from poisoning from Cr vaporization. In the ferritic stainless steel disclosed in Patent Documents 1 and 2, it is difficult to avoid vaporization Cr, there is a problem in adaptability of the SOFC system. In the ferritic stainless steel disclosed in Patent Documents 3 and 5, the oxidation resistance is added by forming Al oxide; however, an effectivity of protective performance of the oxide film in an atmosphere consisting of the reforming gas containing a lot of hydrogen and water vapor is not disclosed in these prior ferritic stainless steels. Furthermore, the prevention of Cr vaporization disclosed in Patent Document 3 requires the formation of Al oxide film, the preliminary oxidation is an essential treatment. In addition to, Patent Documents 4 and 5 do not refer to effectiveness of their disclosures in the prevention of Cr vaporizing; and in the former, an amount of trace element of Sn needs to be controlled, and in the latter, generation of Ti oxide needs to be inhibited.

As is explained above, in the present state, a ferritic stainless steel having the oxidation resistance ensuring durability under the reforming gas conditions and the prevention effect of Cr vaporizing for improving the adaptability of the SOFC system has not been obtained yet without performing the preliminary oxidation.

The present invention has been made in consideration of the above-described circumstances, and an object of the present invention is to provide a ferritic stainless steel for a fuel cell, the ferritic stainless steel can have both a high oxidation resistance under the reforming gas conditions and a prevention effect of Cr vaporizing without adding Al or Si excessively, controlling an amount of trace elements, and performing the preliminary oxidation.

Means for Solving the Problems

[First Aspect]
(1) A ferritic stainless steel for a fuel cell includes, in mass %, Cr: 11 to 25%, C: 0.03% or less, Si: 2% or less, Mn: 2% or less, Al: 0.5 to 4.0%, P: 0.05% or less, S: 0.01% or less, N: 0.03% or less, Ti: 1% or less, and a balance composed of Fe and unavoidable impurities, wherein, a maximal concentration of Al in a surface of the ferritic stainless steel is 30 mass % or more in cation ion fraction excepting O in an depth direction region having twice a thickness of an oxide film having less than 0.1 μm.
(2) The ferritic stainless steel for a fuel cell according to (1), wherein, a maximal concentration of Ti in a surface of the ferritic stainless steel is 3 mass % or more in cation ion fraction excepting O.
(3) The ferritic stainless steel for a fuel cell according to (1) or (2), further includes, in mass %, one or two or more of elements selected from a group consisting of Ni: 1% or less, Cu: 1% or less, Mo: 2% or less, Sn: 1% or less, Sb: 1% or less, W: 1% or less, Co: 0.5% or less, Nb: 0.5% or less, V: 0.5% or less, Zr: 0.5% or less, Ga: 0.1% or less, Mg: 0.01% or less, B: 0.005% or less, Ca: 0.005% or less, La: 0.1% or less, Y: 0.1% or less, Hf: 0.1% or less, and REM: 0.1% or less.
(4) A method for producing the ferritic stainless steel for a fuel cell according to any one of (1) to (3), the method comprising:
a heating step of heating the ferritic stainless steel having a composition of the ferritic stainless steel according to any one of (1) to (3), in an atmosphere containing oxygen or hydrogen at a temperature of 700 to 1100° C., to form an oxide film on a surface of the ferritic stainless steel.
(5) A ferritic stainless steel for a fuel cell includes, in mass %, Cr: 11 to 25%, C: 0.03% or less, Si: 2% or less, Mn: 2% or less, Al: 0.5 to 4.0%, P: 0.05% or less, S: 0.01% or less, N: 0.03% or less, Ti: 1% or less, and a balance composed of Fe and unavoidable impurities, wherein, the maximal concentration of Al in a surface of the ferritic stainless steel is 30 mass % or more in cation ion fraction excepting O in an depth direction region having twice a thickness of an oxide film having less than 0.1 µm, after heating the ferritic stainless steel in an atmosphere containing 50 vol % or more of hydrogen gas and a balance substantively composed of nitrogen gas at a temperature of 800 to 1000° C. in 10 minutes or less and cooling thereof to room temperature.

(6) A ferritic stainless steel for a fuel cell includes, in mass %, Cr: 11 to 25%, C: 0.03% or less, Si: 2% or less, Mn: 2% or less, Al: 0.5 to 4.0%, P: 0.05% or less, S: 0.01% or less, N: 0.03% or less, Ti: 1% or less, and a balance composed of Fe and unavoidable impurities, wherein, a maximal concentration of Al in a surface of the ferritic stainless steel is 30 mass % or more in cation ion fraction excepting O in an depth direction region having twice a thickness of an oxide film having less than 0.1 µm, after heating the ferritic stainless steel in an atmosphere of air at a temperature of 850° C. in 100 hours and cooling thereof to room temperature.

(7) The ferritic stainless steel for a fuel cell according to (5) or (6), wherein, a maximal concentration of Ti in a surface of the ferritic stainless steel is 3 mass % or more in cation ion fraction excepting O.

(8) The ferritic stainless steel for a fuel cell according to any one of (5) to (7), further including, in mass %, one or two or more of elements selected from a group consisting of Ni: 1% or less, Cu: 1% or less, Mo: 2% or less, Sn: 1% or less, Sb: 1% or less, W: 1% or less, Co: 0.5% or less, Nb: 0.5% or less, V: 0.5% or less, Zr: 0.5% or less, Ga: 0.1% or less, Mg: 0.01% or less, B: 0.005% or less, Ca: 0.005% or less, La: 0.1% or less, Y: 0.1% or less, Hf: 0.1% or less, and REM: 0.1% or less.

Hereinafter, inventions relating to the ferritic stainless steel in (1) to (3) and (5) to (8) are referred to as the first aspect of the present invention. Furthermore, sometimes, inventions in (1) to (8) are collectively referred to as the first aspect of the present invention.

[Second Aspect]

(9) A ferritic stainless steel having advantages of a resistance to Cr vaporizing for a fuel cell includes, in mass %, Cr: 11 to 25%, C: 0.03% or less, Si: 2% or less, Mn: 2% or less, Al: 0.5 to 4.0%, P: 0.05% or less, S: 0.01% or less, N: 0.03% or less, Ti: 0.5% or less, and a balance composed of Fe and unavoidable impurities, wherein, the ferritic stainless steel further includes one or two or more of elements selected from a group consisting of Ga: 0.1% or less, Mg: 0.01% or less and Zn: 0.05% or less, a total amount Ga+Mg+Zn satisfies Ga+Mg+Zn>0.001%, and a balance is composed of Fe and unavoidable impurities.

(10) The ferritic stainless steel having advantages of a resistance to Cr vaporizing for a fuel cell according to (9), further including, in mass %, one or two of elements selected from a group consisting of Sn: 1.0% or less, and Sb: 1.0% or less.

(11) The ferritic stainless steel having advantages of a resistance to Cr vaporizing for a fuel cell according to (9) or (10), wherein, the ferritic stainless steel includes in mass %, Si: 0.3% or more, Al: 1.5% or more, and Ti: 0.1% or more.

(12) The ferritic stainless steel having advantages of a resistance to Cr vaporizing for a fuel cell according to any one of (9) to (11), further comprising, in mass %, one or two or more of elements selected from a group consisting of Ni: 1% or less, Cu: 1% or less, Mo: 2% or less, W: 1% or less, Co: 0.5% or less, Nb: 0.5% or less, V: 0.5% or less, Zr: 0.5% or less, B: 0.005% or less, Ca: 0.005% or less, La: 0.1% or less, Y: 0.1% or less, Hf: 0.1% or less, and REM: 0.1% or less.

(13) A method for producing the ferritic stainless steel having advantages of a resistance to Cr vaporizing for a fuel cell, the method including:

a heating step of heating the ferritic stainless steel having a composition of the ferritic stainless steel according to any one of (9) to (12), in an atmosphere containing oxygen or hydrogen at a temperature of 700 to 1100° C., to form an oxide film on a surface of the ferritic stainless steel.

Hereinafter, inventions relating to the ferritic stainless steel in (9) to (12) are referred to as the second aspect of the present invention. Furthermore, sometimes, inventions in (9) to (13) are collectively referred to as the second aspect of the present invention.

Effects of the Invention

By the first aspect of the present invention and the second aspect of the present invention, a ferritic stainless steel, which having both a high oxidation resistance under reformed gas and an effect of Cr vaporization inhibition, can be provided for a fuel cell, without relying on an excessive additions of Al and Si, preparations of trace element, and a preliminary oxidation.

BEST MODE FOR CARRYING OUT THE INVENTION

The specific embodiments in the First Aspect and the Second Aspect are described below. Unless particularly stated otherwise, % values used in relation to the composition refer to mass % values.

[First Aspect]

In order to achieve the object described above, the present inventors had investigated a relationship between an surface composition of ferritic stainless steel containing Al and a Cr vaporization in an atmosphere containing a lot of water vapor and hydrogen assumed as a reformed gas environment, and the first aspect of the present invention has been accomplished. Hereinafter, findings obtained by the First Aspect of the present invention will be described.

(1-a) When the reformed gas environment having a state where a lot of water vapor and hydrogen are coexistent is compared with a steam oxidation environment which is free of air and hydrogen, in the reformed gas environment, a Cr vaporization tends to promote since an oxidation of Cr is facilitated in the ferritic stainless steel containing Al. Although little is known about a pro-oxidant mechanism of Cr, this is assumed to be related to improve a Cr external diffusion in an oxidation environment containing water vapor while hydrogen gas induces defect productions in an Al oxide film.

(1-b) The above-described oxidation of Cr in the reformed gas environment is significantly influenced by a surface film formed on the ferritic stainless steel containing Al. Ordinary, after an acid cleaning process or polishing, a Fe—Cr passivation film is formed on the surface of the ferritic stainless steel containing Al. The Cr vaporization tends to promote when the passivation film mainly composed of Fe—Cr is formed on the surface of the ferritic stainless steel containing Al. The present inventors obtained new findings that it is possible to prevent Cr from vaporizing in the above environment and to significantly inhibit Cr vaporization by previously condensing Al and Ti in an oxide film or in a surface of the stainless steel immediately beneath the oxide film.

(1-c) The present inventors obtained new findings that addition of a small amount of Mg, Ga, Sn, and Sb is more effective for inhibiting Cr vaporization by increasing the Ti and Al levels in the oxide film or in the surface of the stainless steel immediately beneath the oxide film, than excessive increase of an additive amount of Ti and Al. Since all of these elements are surface active elements, a selective oxidation of Ti and Al, which is smaller than Cr in free energy of forming oxide and is oxidizable easily, are promoted with preventing Cr from oxygenating by condensing in a vicinity of surface, thereby the effect inhibiting the Cr vaporizing is expressed.

(1-d) After cold rolling, a bright annealing performed in a low dew point atmosphere containing hydrogen gas is effective for condensing Al and Ti efficiently in the oxide film or in the surface of the stainless steel immediately beneath the oxide film. In this case, the addition of the small amount of one or more element selected from the group consisting of Mg, Ga, Sn, and Sb is effective for a formation of the oxide film or the surface of the stainless steel immediately beneath the oxide film in which Al and Ti are condensed.

(1-e) Furthermore, the present inventors obtained findings that it is possible to prevent Cr from vaporization, when Al and Ti are condensed in the oxide film or in the surface of the stainless steel immediately beneath the oxide film by performing not only the bright annealing in the atmosphere containing hydrogen gas, but also an appropriate preliminary oxidation in an atmosphere containing oxygen such as an air As is explained above, the present inventors obtained new findings that it is possible to prevent Cr from vaporization in the reformed gas environment by the formation of the oxide film or the surface of the stainless steel immediately beneath the oxide film in which Al and Ti are condensed. Additionally, the addition of the small amount of Mg, Ga, Sn, and Sb and the bright annealing are effective for the formation of the oxide film or the surface of the stainless steel immediately beneath the oxide film in which Al and Ti are condensed and the Cr vaporization inhibition in the reformed gas environment. The First Aspect of the present invention disclosed above (1) to (8) was completed on the basis of these findings.

1-(I) The details of the constituents are shown below.

Cr is used as basic constituent elements to ensure a corrosion resistance and a protective performance of a surface oxide film for achieving objects of the First Aspect. In the First Aspect of the present invention, when the amount of added Cr is less than 11%, a target oxidation resistance is not ensured sufficiently. In the case that the oxidation resistance lacks, since the oxide film grows, the Cr vaporization inhibition effect as the object of the First Aspect cannot be obtained. The lower limit for the amount of Cr is 11%. On the other hand, excessive addition of Cr results in the promotion of a σ phase (an embrittlement phase) formation under a high temperature, in addition to the excessive addition of Cr results in an increase in alloy production cost and Cr vaporization, and thereby making it difficult to achieve the objects of the First Aspect of the present invention. The upper limit for the amount of added Cr is preferably set to 25% from the viewpoint of basic characteristics, the manufacturing efficiency, and the Cr vaporization inhibition effect as the objects of the First Aspect of the present invention. The amount of added Cr is preferably from 13% to 22%, and more preferably from 16% to 20% from the viewpoint of basic characteristics, oxidation resistance, and cost.

C forms a solid solution or a Cr carbide in the ferrite phase, thereby the oxidation resistance is inhibited and, inhibiting Cr vaporization, and preventing the objects of the First Aspect of the present invention from being obtained. Accordingly, the amount of C must be reduced as much as possible, and the upper limit for the amount of C is set to 0.03%. However, when the amount of C is too low, the refining cost increases, and therefore the lower limit for the amount of C is set to 0.001%. The amount of C is more preferably from 0.002% to 0.02% from the viewpoint of oxidation resistance and manufacturing efficiency.

Si is an important element to ensure the oxidation resistance as the objects of the First Aspect of the present invention. Si is slightly subjected to solid solution in an Al oxide film and is condensed in the surface immediately beneath the oxide film and/or a surface boundary of the steel, in order to improve the oxidation resistance under the reformed gas environment. This effect is achieved when the lower limit for the amount of Si is preferably 0.1%. On the other hand, the upper limit for the amount of Si is 2%, since excessive addition of Si results in a decrease of the toughness and the workability of the stainless steel and inhibits of the formation of the Al oxide film which is one of the objects of the First Aspect of the present invention. The amount of Si is preferably 1% or less from the viewpoint of oxidation resistance and basic characteristics. When the effect obtained by Si is used actively, the amount of Si is more preferably from 0.3% to 1%.

Mn is subjected to solid solution in the oxide film along with Si in the reformed gas environment to improve the protective performance. This effect is achieved when the lower limit for the amount of Mn is preferably 0.1%. On the other hand, excessive addition of Mn results in deteriorations of corrosion resistance of the stainless steel and inhibition of Ti and Al oxide films formation as the objects of the First Aspect of the present invention, and therefore the upper limit for the amount of Mn is set to 2% or less. The upper limit is preferably 1% or less from the viewpoint of oxidation resistance and basic characteristics. When the effect obtained by Mn is used actively, the amount of Mn is more preferably from 0.2% to 1%. The ferritic stainless steel can be practically free from Mn.

Al is a deoxidizing element and an additive element that is essential for forming the Al oxide film which is the objects of the First Aspect of the present invention to prevent Cr from vaporization. In the First Aspect of the present invention, the Cr vaporization inhibition effect cannot be achieved when the amount of Al is less than 0.5%. Therefore, the lower limit for the amount of Al is 0.5%. On the other hand, excessive addition of Al results in a deterioration of the toughness and the weldability of the stainless steel, thereby decreasing the productivity of the stainless steel. Therefore, the alloy cost increases and problems are caused in the economies. The upper limit for the amount of Al is set to 4.0% from the viewpoint of basic characteristics and cost. In the First Aspect of the present invention, the amount of Al is more preferably from 1.0% to 3.5% from the viewpoint of inhibiting Cr vaporization, basic characteristics, and cost. Further, the amount of Al is more preferably from 1.5% to 2.5% from the viewpoint of manufacturing efficiency.

P is an element which has an adverse effect on the manufacturing efficiency and the weldability, and the amount of P must be reduced as far as possible. Accordingly, the upper limit for the amount of P is 0.05%. However, when the amount of P is too low, the refining cost increases, and therefore the lower limit for the amount of P is preferably set to 0.003%. The amount of P is preferably from 0.005% to 0.04%, and more preferably from 0.01% to 0.03% from the viewpoint of manufacturing efficiency and weldability.

S is an element that is incorporated unavoidably in the stainless steel, and the protective performance of the Al film which is the objects of the First Aspect of the present invention is decreased by S. When Mn inclusion or S subjected to solid solution is incorporated in the stainless steel, the Mn inclusion or the S subjected to solid solution acts as fracture origins of the Al oxide film while use in high temperature or a long period, and therefore the effect of inhibiting Cr vaporization cannot be achieved. Accordingly, the amount of S must be reduced as far as possible, and the upper limit for the amount of S is set to 0.01%. However, when the amount of S is too low, the refining cost or a material cost increases, and therefore the lower limit for the amount of S is set to 0.0001%. The amount of S is preferably from 0.0001% to 0.002%, and is more preferably from 0.0002% to 0.001% from the viewpoint of oxidation resistance and manufacturing efficiency.

In a similar manner to C, the oxidation resistance which is the objects of the First Aspect of the present invention is inhibited by N. Accordingly, the amount of N must be reduced as far as possible, and the upper limit for the amount of C is set to 0.03%. However, when the amount of N is too low, the refining cost increases, and therefore the lower limit for the amount of N is set to 0.002%. The amount of N is more preferably from 0.005% to 0.02% from the viewpoint of oxidation resistance and manufacturing efficiency.

Ti improves the oxidation resistance while C and N are fixed by Ti as a stabilization element to purify the stainless steel. Furthermore, Ti is an element that is useful for forming the Ti oxide outside the Al oxide film to prevent Cr vaporization, thereby achieving the objects of the First Aspect of the present invention. These effects are achieved when the lower limit for the amount of Ti is preferably 0.01%. On the other hand, excessive addition of Ti results in the promotion of the increasing in alloy production cost, a deterioration of the manufacturing efficiency with a rise in the recrystallized temperature, and a deterioration of the oxidation resistance, thereby preventing the achievement of the effect of inhibiting Cr vaporization, so the upper limit for the amount of Ti is set to 1%. The amount of Ti is preferably from 0.05% to 0.5% from the viewpoint of alloy production cost, manufacturing efficiency, and oxidation resistance. When the effect obtained by Ti is used actively, the amount of Ti is more preferably from 0.1% to 0.4%. The ferritic stainless steel can be practically free from Ti.

In addition to the above basic component, one or more element selected from a group consisting of Mg, Ga, Sn, and Sb is preferably added to the ferritic stainless steel in the small amount, to prevent Cr from vaporization and to achieve the objects of the First Aspect of the present invention by the formation of the oxide film or the surface of the stainless steel immediately beneath the oxide film. As is explained above, these elements are condensed in a vicinity of surface, and therefore the effect of inhibiting Cr oxidation and selective oxidation of Ti and Al are promoted. In order to achieve these effects, the lower limits for the amounts of Mg and Ga are preferably 0.0005% and the lower limits for the amounts of Sn and Sb are preferably 0.005%. On the other hand, excessive addition of these elements results in a deterioration of the manufacturing efficiency due to an increase in the refining cost of the stainless steel and a decrease in toughness. Therefore, the upper limits for the amount of these elements are set to Mg: 0.01%, Ga: 0.1%, Sn: 1%, and Sb: 1%. The amounts of these elements are preferably Mg: 0.001% to 0.005%, Ga: 0.001% to 0.01%, Sn: 0.01% to 0.5%, and Sb: 0.01% to 0.5% from the viewpoint of inhibiting Cr vaporization which is an object of the First Aspect of the present invention and basic characteristics.

In the First Aspect of the present invention, the stainless steel may include one or two or more elements selected from a group consisting of Ni: 1% or less, Cu: 1% or less, Mo: 2% or less, W: 1% or less, Co: 0.5% or less, Nb: 0.5% or less, V: 0.5% or less, Zr: 0.5% or less, B: 0.005% or less, Ca: 0.005% or less, La: 0.1% or less, Y: 0.1% or less, Hf: 0.1% or less, and REM: 0.1% or less, as needed.

Ni, Cu, Mo, W, Co, Nb, and V are the elements that are useful for improving the high-temperature strength and the corrosion resistance, and these elements are added to the stainless steel as needed. However, excessive addition of these elements results in an increase in alloy production cost, and thereby the productivity of the stainless steel decreases. Therefore, the upper limits for the amounts of Ni, Cu, and W are set to 1%. Since Mo is the element that is useful for preventing the stainless steel from deforming in the high-temperature while the thermal expansion coefficient decreases, the upper limit for the amount of Mo is 2%. The upper limits for the amounts of Co, Nb, and V are set to 0.5%. The lower limits for the amounts of these elements are preferably 0.1%.

B and Ca are the elements which improve the hot workability or the secondary workability, and these elements are added to the stainless steel as needed. However, excessive addition of these elements results in the deterioration of the manufacturing efficiency, and therefore the upper limits for the amounts of B and Ca are set to 0.005%. The lower limits for the amounts of B and Ca are preferably 0.0001%.

Zr, La, Y, Hf, and REM are the elements that are useful for improving the hot workability, the cleanliness evaluation, and the oxidation resistance, and these elements may be added to the stainless steel as needed. However, the addition effects of these elements are not indispensable, from the viewpoint of technological thoughts in the First Aspect of the present invention and a reduction of the alloy cost. When these elements are added to the stainless steel, the upper limit for the amount of Zr is 0.5%, the each of the upper limits for the amounts of La, Y, Hf, and REM is 0.1%. The lower limit for the amount of Zr is preferably 0.01%, and the lower limits for the amounts of La, Y, Hf, and REM are preferably 0.001%. REM shows elements in atomic numbers 57 to 71, for example, Pr, Nd, and the like.

Besides the above elements, other elements may be added to the stainless steel in the amount not to deteriorate the effects of the First Aspect of the present invention. Not only the amounts of P and S interpreted as typically unavoidable impurities, but also the amounts of Zn, Bi, Pb, Se, H, and Ta must be reduced as far as possible. The amounts of these elements may be controlled in the amount to solve the problem of the First Aspect of the present invention, and therefore one or more elements selected from a group consisting of Zn≤300 ppm, Bi≤100 ppm, Pb≤100 ppm, Se≤100 ppm, H≤100 ppm, and Ta≤500 ppm are added to the stainless steel as needed.

1-(II) The details of the surface of the stainless steel are shown below.

In the ferritic stainless steel for a fuel cell in the First Aspect of the present invention containing the above composition, the oxide film having a thickness of less than 0.1 μm is formed on the surface of the ferritic stainless steel, Al is condensed in the oxide film, and Ti is preferably condensed in the oxide film. The thickness in the depth direction region having twice a thickness of the oxide film is less than 0.2 μm, the thickness therein is preferably less than 0.1 μm, and more preferably less than 0.05 μm in view of efficiencies of the bright annealing and the preliminary oxidation in air. The lower limit of the thickness in the depth direction region having twice a thickness of the oxide film is not particularly limited, the value is preferably 0.005 μm or more having the oxidation resistance and the Cr vaporization inhibition effect in the reformed gas environment. The thickness is more preferably 0.01 μm or more.

The composition in the oxide film or in the surface of the stainless steel immediately beneath the oxide film is that the maximal concentration of Al is 30 mass % or more in the cation ion fraction excepting O, in order to exert the oxidation resistance and the Cr vaporization inhibition effect in the reformed gas environment. The surface of the stainless steel immediately beneath the oxide film is defined as the region to the depth having the same thickness as the surface film. That is, the surface of the stainless steel immediately beneath the oxide film is defined as the depth direction region having twice the thickness of an oxide film from immediately beneath the oxide film. Furthermore, in the cation ion fraction excepting O, the maximal concentration of Ti is preferably 3 mass % or more. Ti forms the oxide outside the Al oxide film, and therefore the Cr vaporization inhibition effect is exerted. When the maximal concentration of Ti is 3 mass % or more, this effect is exerted in the stainless steel, the maximal concentration of Ti is preferably 10 mass % or more, and is more preferably 20 mass % or more. The upper limit of the Ti concentration is not particularly limited, the value is preferably 60 mass %, and more preferably 50 mass % in view of efficiencies of the bright annealing and the preliminary oxidation. In the case of ether alone Al or with Ti, Al forms the Al oxide film to exert the Cr vaporization inhibition effect in the reformed gas environment. When the maximal concentration of Al in the oxide film or in the surface of the stainless steel immediately beneath the oxide film is 30 mass % or more, this effect is exerted in the stainless steel, the maximal concentration of Al is preferably 40 mass % or more, and more preferably 50 mass % or more. The upper limit of the Al concentration is not particularly limited, the value is preferably 90 mass %, and more preferably 80 mass % in view of efficiencies of the bright annealing and the preliminary oxidation. In order to obtain the Cr vaporization inhibition effect in the objects of the First Aspect of the present invention, it is preferable that Ti and Al are concentrated on the oxide film or on the surface of the stainless steel immediately beneath the oxide film while combining Ti and Al, the maximal concentration of Ti is preferably 10 mass % to 50 mass %, and the maximal concentration of Al is preferably 50 mass % to 80 mass %.

Ti and Al in the oxide film or in the surface of the stainless steel immediately beneath the oxide film are detected along with light elements such as O and C and stainless steel constituent elements such as Fe and Cr by a glow-discharge mass spectrometry (GDS), each element profile on the surface of the stainless steel is determined. By using determined results of each element profile in the surface of the stainless steel, the thickness of the oxide film is calculated from the portion (half-value width) that the detected intensity of O becomes half from the surface of the stainless steel in the depth direction. The maximal concentrations of Ti and Al are obtained by excepting the light elements such as O and C from the determined results of each element profile, converting the each element profile in cation ion fraction, and adopting the values in the portion indicated the maximal concentrations of Ti and Al in the depth direction region having twice the thickness of an oxide film.

1-(III) The details of the method of producing the ferritic stainless steel is shown below.

The ferritic stainless steel of the First Aspect of the present invention is mainly a cold rolled annealed plate obtained by a method that following an annealed or not annealed hot rolled steel strip is descaled and cold rolled, a final annealing and a descaling are performed. In some cases, a hot rolled annealed plate which is not subjected to a cold rolling can be used as the ferritic stainless steel of the First Aspect of the present invention. Furthermore, the ferritic stainless steel used as a gas piping includes a welded pipe formed from a steel plate. The gas piping is not limited to the welded pipe, a seamless pipe formed by the hot rolling may be used. In the above steel, a temperature of the final annealing is preferably 700° C. to 1100° C. When the temperature is less than 700° C., softening and recrystallization of the steel are insufficient, and predetermined material properties cannot be obtained. On the other hand, when the temperature is more than 1100° C., coarse particles are formed, as a result, toughness and ductility are inhibited.

1-(IV) The details of the bright annealing and the preliminary oxidation for forming the oxide film or the surface of the stainless steel immediately beneath the oxide film are shown below.

As is explained above, the reformed gas environment in the First Aspect of the present invention is an environment subjected to an oxidizing atmosphere including a lot of water vapor, hydrogen, carbon dioxide, carbon monoxide at a high temperature of 200° C. to 900° C. In comparison to other common oxidizing atmosphere, the Cr vaporization in the above environment enters harsh conditions. Therefore, the Cr vaporization inhibition is expressed in other oxidizing atmosphere including air and water vapor, as well as the above environment. In the First Aspect of the present invention, after the cold rolling, the bright annealing performed in a low dew point atmosphere containing hydrogen gas is effective for forming the oxide film or the surface of the stainless steel immediately beneath the oxide film in which Al and Ti are condensed. The atmosphere gas of the bright annealing includes 50 vol % or more of hydrogen and a balance of inert gas substantively composed of nitrogen gas to inhibit the oxidation of Cr and to oxygenating Ti and Al selectively. The balance substantively composed of nitrogen gas means that gas components except for nitrogen gas and hydrogen gas contained in the balance is less than 1%. The dew point in the atmosphere gas is preferably −40° C. or less, and the volume of the hydrogen gas is preferably 75 vol % or more, and more preferably 90 vol % or more. The inert gas is preferably nitrogen gas since the cost of an industrial supply thereof is relatively low; however, Ar gas or He gas may be used as the e inert gas. As the range that the formation of the surface (oxide) film in the First Aspect of the present invention is promoted and has no problems, the Gas such as less than 5 vol % of oxygen may be mixed in the atmosphere gas. The temperature of the bright annealing is 800° C. or more which is effective for reducing the dew point of the atmosphere gas in the value of more than or equal to the recrystallized temperature of steel, and the temperature of the bright annealing is preferably 900° C. or more. On the other hand, when the temperature of the bright annealing is more than 1100° C., coarse particles are formed, and as a result, the steel has an undesirable toughness and undesirable ductility. The heating temperature of the steel is preferably from 900° C. to 1050° C. The heating time for remaining the steel in the above temperature is preferably 10 minutes or less, in the case that the bright annealing is performed in an industrial continuous anneal line. The heating time is more preferably 5 minutes or less. The lower limit of the heating time is not particularly limited, the value is preferably 10 seconds. When the bright annealing is performed in a batch furnace, both the lower limit of the heating temperature and the upper limit of the heating time are not particularly limited, for example, the bright annealing may be performed at 700° C. in 24 hours. In the ferritic stainless steel of the First Aspect of the present invention, the condition of the bright annealing is not particularly limited, in the case that the surface (oxide) film in the First Aspect of the present invention is formed and the Cr vaporization inhibition is achieved.

In the First Aspect of the present invention, the oxide film or the surface of the stainless steel immediately beneath the oxide film can be formed by the preliminary oxidation without performing the above bright annealing. In the steel produced by a method explained in the above 1-(III), by subjecting the preliminary oxidation to the steel before using for the fuel cell, the formation of the oxide film or the surface of the stainless steel immediately beneath the oxide film, in which Al and Ti are condensed, is effective in an initial stage of the system operation. Furthermore, the bright annealing materials obtained by bright annealing the steel may be subjected to preliminary oxidation.

The preliminary oxidation is preferably performed in the oxidizing atmosphere includes oxygen, and air is used as a simplified oxidizing atmosphere. The conditions for the preliminary oxidation are preferably that the atmosphere is air, the temperature is 700° C. to 1100° C., the heating time is 10 h to 1000 h with considering the time of the initial stage of the system operation. The conditions for the preliminary oxidation are more preferably that the atmosphere is air, the temperature is 800° C. to 900° C., the heating time is 50 h to 100 h, and when the preliminary oxidation are performed in this condition, the surface in which Al and Ti are condensed in the depth direction region having twice the thickness of the oxide film having less than 0.1 μm can be formed to achieve the object of the First Aspect of the present invention. In the ferritic stainless steel of the First Aspect of the present invention, the condition of the preliminary oxidation is not particularly limited, in the case that the oxide film or the surface of the stainless steel immediately beneath the oxide film in the First Aspect of the present invention is formed and the Cr vaporization inhibition is achieved.

When the stainless steel having the composition of the present invention is used and the bright annealing or the preliminary oxidation is performed, less than 0.2 μm of the depth direction region having twice the thickness of the oxide film can be obtained.

[Second Aspect]

In order to achieve the object described above, the present inventors had investigated a relationship between the surface composition of ferritic stainless steel containing Al and the Cr vaporization in the atmosphere containing a lot of water vapor and hydrogen assumed as the reformed gas environment, and the second aspect of the present invention has been accomplished. Hereinafter, findings obtained by the Second Aspect of the present invention will be described.

(2-a) When the reformed gas environment having a state where a lot of water vapor and hydrogen are coexistent is compared with a steam oxidation environment which is free of air and hydrogen, in the reformed gas environment, a Cr vaporization tends to promote since an oxidation of Cr is facilitated in the ferritic stainless steel containing Al. Although little is known about a pro-oxidant mechanism of Cr, this is assumed to be related to improve a Cr external diffusion in an oxidation environment containing water vapor while hydrogen gas induces defect productions in an Al oxide film.

(2-b) The above-described oxidation of Cr in the reformed gas environment is significantly influenced by a surface film formed on the ferritic stainless steel containing Al. Ordinary, after an acid cleaning process or polishing, a Fe—Cr passivation film is formed on the surface of the ferritic stainless steel containing Al. The Cr vaporization tends to promote when the passivation film mainly composed of Fe—Cr is formed on the surface of the ferritic stainless steel containing Al.

(2-c) The present inventors obtained new findings that addition of a small amount of Mg, Ga, and Zn, and further a small amount of Sn and Sb is more effective for inhibiting the Cr vaporization by reforming the surface film, than excessive increase of an additive amount of Ti and Al. Since all of these elements are surface active elements, a selective oxidation of Ti and Al, which is smaller than Cr in free energy of forming oxide and is oxidizable easily, are promoted with preventing Cr from oxygenating by condensing in a vicinity of surface, thereby the effect inhibiting Cr vaporizing is expressed. Specifically, the effect is remarkable, when the total amount of Mg, Ga, and Zn exceeds 0.001%.

(2-d) When the stainless steel having the above composition of is used, after the cold rolling, the oxide film is formed after a final annealing and the acid washing, as a result, the Cr vaporization can be inhibited sufficiently by the oxide film. The present inventors considered that since Ti and/or Al are preliminarily condensed on the surface film, the oxidization of Cr in the above environment is inhibited, and thereby the Cr vaporizing can be inhibited remarkably.

(2-e) After cold rolling, a bright annealing performed in a low dew point atmosphere containing hydrogen gas is effective for exerting the Cr vaporization inhibition effect on the surface film. In this case, the addition of the small amount of one or more element selected from the group consisting of Mg, Ga, Zn, Sn, and Sb is effective for a formation of the surface film in which Al and/or Ti are condensed.

(2-f) Furthermore, the present inventors found that it is possible to prevent Cr from vaporization, when Al and Ti are condensed in the surface film by performing not only the bright annealing in the atmosphere containing hydrogen gas, but also an appropriate preliminary oxidation in an atmosphere containing oxygen such as an air or acid washing conditions performed after annealing.

As is explained above, the present inventors obtained new findings that it is possible to prevent Cr from vaporization in the reformed gas environment by the formation of the reformed surface film. Additionally, the addition of a small amount of Mg, Ga, and Zn, and further the small amount of Sn and Sb is effective for the formation of the surface film in which Ti and/or Al are condensed and the Cr vaporization inhibition in the reformed gas environment. The Second Aspect of the present invention disclosed above (9) to (13) was completed on the basis of these findings.

2-(I) The details of the constituents are shown below.

Cr is used as basic constituent elements to ensure a corrosion resistance and a protective performance of a surface oxide film for achieving objects of the Second Aspect. In the Second Aspect of the present invention, when the amount of added Cr is less than 11%, a target oxidation resistance is not ensured sufficiently. Therefore, the lower limit for the amount of Cr is 11%. On the other hand, excessive addition of Cr results in the promotion of a σ phase (an embrittlement phase) formation under a high temperature, in addition to the excessive addition of Cr results in the an increase in alloy production cost and Cr vaporization, and thereby making it difficult to achieve the objects of the Second Aspect of the present invention. The upper limit of the amount of added Cr is preferably set to 25% from the viewpoint of basic characteristics, manufacturing efficiency, and the Cr vaporization inhibition effect as the objects of the Second Aspect of the present invention. The amount of added Cr is preferably from 13% to 22%, and more preferably from 16% to 20% from the viewpoint of basic characteristics, oxidation resistance, and cost.

C forms a solid solution or a Cr carbide in the ferrite phase, and thereby the oxidation resistance is inhibited and the objects of the Second Aspect of the present invention cannot be achieved. Accordingly, the amount of C must be reduced as far as possible, and the upper limit for the amount of C is set to 0.03%. However, when the amount of C is too low, the refining cost increases, and therefore the lower limit of the amount of C is set to 0.001%. The amount of C is more preferably from 0.002% to 0.02% from the viewpoint of oxidation resistance and manufacturing efficiency.

Si is an important element to ensure the oxidation resistance as the objects of the Second Aspect of the present invention. The effects of Si, the preferable amount of Si, and the significance of critical range of the amount of Si are the same as shown in the First Aspect of the present invention.

Mn is subjected to solid solution in the oxide film along with Si in the reformed gas environment to improve the protective performance. The effects of Mn, the preferable amount of Mn, and the significance of critical range of the amount of Mn are the same as shown in the First Aspect of the present invention.

Al is a deoxidizing element and an additive element that is essential for forming the Al oxide film which is the objects of the Second Aspect of the present invention to prevent Cr from vaporization. The effects of Al, the preferable amount of Al, and the significance of critical range of the amount of Al are the same as shown in the First Aspect of the present invention.

P is an element which has an adverse effect on the manufacturing efficiency and the weldability, and the amount of P must be reduced as far as possible. The effects of P, the preferable amount of P, and the significance of critical range of the amount of P are the same as shown in the First Aspect of the present invention.

S is an element that is incorporated unavoidably in the stainless steel, and the protective performance of the Al film which is the objects of the Second Aspect of the present invention is decreased by S. When Mn inclusion or S subjected to solid solution is incorporated in the stainless steel, the Mn inclusion or the S subjected to solid solution acts as fracture origins of the Al oxide film while use in high temperature or a long period. Accordingly, the amount of S must be reduced as far as possible, and the upper limit for the amount of S is set to 0.01%. However, when the amount of S is too low, a refining cost or a material cost increases, and therefore the lower limit for the amount of S is set to 0.0001%. The amount of S is preferably from 0.0001% to 0.002%, and is more preferably from 0.0002% to 0.001% from the viewpoint of oxidation resistance and manufacturing efficiency.

In a similar manner to C, the oxidation resistance which is the objects of the Second Aspect of the present invention is inhibited by N. The effects of N, the preferable amount of N, and the significance of critical range of the amount of N are the same as shown in the First Aspect of the present invention.

Ti improves the oxidation resistance while C and N are fixed by Ti as a stabilization element to purify the stainless steel. Furthermore, Ti is an element that is useful for forming the Ti oxide outside the Al oxide film to prevent Cr vaporization, and thereby for achieving the objects of the Second Aspect of the present invention. These effects are achieved when the lower limit for the amount of Ti is preferably 0.01%. On the other hand, excessive addition of Ti results in the promotion of the increasing in alloy production cost, a deterioration of the manufacturing efficiency due to a rise in the recrystallized temperature, and a deterioration of the oxidation resistance, so the upper limit for the amount of Ti is set to 0.5%. The amount of Ti is preferably from 0.05% to 0.5% from the viewpoint of alloy production cost, manufacturing efficiency, and oxidation resistance. When the effect obtained by Ti is used actively, the amount of Ti is more preferably from 0.1% to 0.4%. The ferritic stainless steel can be practically free from Ti.

In addition to the above basic component, one or more element selected from a group consisting of Mg, Ga, and Zn is preferably added to the ferritic stainless steel to prevent Cr from vaporizing by reforming the surface film. When these elements are added to the ferritic stainless steel, Cr vaporization can be inhibited. These elements are condensed in a vicinity of surface, and therefore the effect of inhibiting Cr oxidation and the selective oxidation of Ti and Al are promoted. In order to achieve these effects, the total amount of Mg, Ga, and Zn is more than 0.001%. The lower limit of the total amount of Mg, Ga, and Zn is preferably 0.0005%. On the other hand, excessive addition of these elements results in a deterioration of manufacturing efficiency by increasing the refining cost of the stainless steel and decreasing toughness. Therefore, the upper limits for the amount of these elements are set to Mg: 0.01%, Ga: 0.1%, and Zn: 0.05%. The amounts of these elements are preferably Mg: 0.001% to 0.005%, Ga: 0.001% to 0.01%, and Zn: 0.001% to 0.03% from the viewpoint of the Cr vaporization inhibition effect which is an object of the Second Aspect of the present invention and basic characteristics.

In addition to Mg, Ga, and Zn, addition of one or two element selected from a group consisting of Sn and Sb is effective for inhibiting the Cr vaporization. The lower limits for the amount of Sn and Sb are preferably set to 0.005%. The upper limits for the amount of these elements are set to Sn: 1.0% and Sb: 1.0%. The amounts of these elements are preferably Sn: 0.01% to 0.5% and Sb: 0.01% to 0.5% from the viewpoint of the Cr vaporization inhibition effect which is an object of the Second Aspect of the present invention and basic characteristics.

In the Second Aspect of the present invention, the stainless steel may include one or two or more elements selected from a group consisting of Ni: 1% or less, Cu: 1% or less, Mo: 2% or less, W: 1% or less, Co: 0.5% or less, Nb: 0.5% or less, V: 0.5% or less, Zr: 0.5% or less, B: 0.005% or less, Ca: 0.005% or less, La: 0.1% or less, Y: 0.1% or less, Hf: 0.1% or less, and REM: 0.1% or less, as needed.

In Ni, Cu, Mo, W, Co, Nb, and V, the effects thereof, the preferable amount thereof, and the significance of critical range of the amount thereof are the same as that shown in the First Aspect of the present invention.

In Ba and Ca, the effects thereof, the preferable amount thereof, and the significance of critical range of the amount thereof are the same as shown in the First Aspect of the present invention.

In Zr, La, Y, Hf, and REM, the effects thereof, the preferable amount thereof, and the significance of critical range of the amount thereof are the same as shown in the First Aspect of the present invention.

Besides the above elements, other elements may be added to the stainless steel in the amount not to deteriorate the effects of the Second Aspect of the present invention. Not only the amounts of P and S interpreted as typically unavoidable impurities, but also the amounts of Bi, Pb, Se, H, and Ta must be reduced as far as possible. The amounts of these elements may be controlled in the amount to solve the problem of the Second Aspect of the present invention, and therefore one or more elements selected from a group consisting of Bi≤100 ppm, Pb≤100 ppm, Se≤100 ppm, H≤100 ppm, and Ta≤500 ppm are added to the stainless steel as needed.

2-(II) The details of the method of producing the ferritic stainless steel is shown below.

The ferritic stainless steel of the Second Aspect of the present invention is obtained by the method of producing the ferritic stainless steel explained in the above 1-(III) in the First Aspect.

2-(III) The details of the final annealing-acid washing, the bright annealing, and the preliminary oxidation for inhibiting the Cr vaporization are shown below.

As is explained above, the reformed gas environment in the Second Aspect of the present invention is an environment subjected to an oxidizing atmosphere including a lot of water vapor, hydrogen, carbon dioxide, carbon monoxide at a high temperature of 200° C. to 900° C. Compared to other common oxidizing atmospheres, Cr vaporization in the above environment is a harsh one for Cr Vaporization. Therefore, the Cr vaporization inhibition is expressed in other oxidizing atmosphere including air and water vapor, as well as the above environment. In order to obtain the resistance to Cr vaporizing as the object of the Second Aspect of the present invention, the ferritic stainless steel, in which in addition to Mg, Ga, and Zn, and further Sn and Sb are added in the small amount determined in the Second Aspect as needed; is prepared; and the ferritic stainless steel is subjected to the acid washing after the common final annealing. By the above process, the surface film, which is suitable for providing the resistance to Cr vaporizing, may be formed. The oxides formed by annealing are subjected to the chemical descaling using an acid solution such as sulfuric acid, nitric acid, and nitric-hydrofluoric acid. After the descaling, a passivation film made of Fe—Cr having a thickness of 0.001 μm to 0.005 μm is formed on the surface of the ferritic stainless steel. When the descaled steel is subjected to an electrolytic pickling treatment in a solution including sulfuric acid and nitric acid, Ti and Al are condensed in the surface film having a thickness of 0.001 μm to 0.005 μm.

In the Second Aspect of the present invention, after the cold rolling, the bright annealing performed in a low dew point atmosphere containing hydrogen gas is effective for forming the surface film. The atmosphere gas of the bright annealing includes 50 vol % or more of hydrogen and a balance of inert gas substantively composed of nitrogen gas to inhibit the oxidation of Cr and to oxygenating Ti and Al selectively. The balance substantively composed of nitrogen gas means that gas components except for nitrogen gas and hydrogen gas contained in the balance is less than 1%. The dew point in the atmosphere gas is preferably −40° C. or less, and the volume of the hydrogen gas is preferably 75 vol % or more, and more preferably 90 vol % or more. The inert gas is preferably nitrogen gas since the nitrogen gas is industrially low cost, however, Ar gas or He gas may be used as the e inert gas. As the range that the resistance to Cr vaporizing in the second Aspect of the present invention is not inhibited, the Gas such as less than 5 vol % of oxygen may be mixed in the atmosphere gas. The temperature of the bright annealing is 800° C. or more which is effective for reducing the dew point of the atmosphere gas in the value of more than or equal to the recrystallized temperature of steel, and the temperature of the bright annealing is preferably 900° C. or more. On the other hand, when the temperature of the bright annealing is more than 1100° C., coarse particles are formed, and as a result, the steel has an undesirable toughness and undesirable ductility. The heating temperature of the steel is preferably from 900° C. to 1050° C. The heating time for remaining the steel in the above temperature is preferably 10 minutes or less, in the case that the bright annealing is performed in an industrial continuous anneal line. The heating time is more preferably 5 minutes or less. When the bright annealing is performed in a batch furnace, both the lower limit of the heating temperature and the upper limit of the heating time are not particularly limited, for example, the bright annealing may be performed at 700° C. in 24 hours. In the ferritic stainless steel of the Second Aspect of the present invention, the condition of the bright annealing is not particularly limited, in the case that the surface film in the Second Aspect of the present invention is formed and the Cr vaporization inhibition is achieved.

In the Second Aspect of the present invention, the surface film having the resistance to Cr vaporizing can be formed by the preliminary oxidation without performing the above bright annealing. In the above steel, by subjecting the preliminary oxidation to the steel before using for the fuel cell, the formation of the surface film is effective in an initial stage of the system operation. Furthermore, the bright annealing materials obtained by bright annealing the steel may be subjected to the preliminary oxidation.

The preliminary oxidation is preferably performed in the oxidizing atmosphere includes oxygen, and air is used as a simplified oxidizing atmosphere. The conditions for the preliminary oxidation are preferably that the atmosphere is air, the temperature is 700° C. to 1100° C., the heating time is 10 h to 1000 h with considering the time of the initial stage of the system operation. The conditions for the preliminary oxidation are more preferably that the atmosphere is air, the temperature is 800° C. to 900° C., the heating time is 50 h to 100 h, and when the preliminary oxidation are performed in this condition, the surface film in which Al and Ti are condensed can be formed to provide the resistance to Cr vaporizing in the Second Aspect of the present invention. In the ferritic stainless steel of the Second Aspect of the present invention, the condition of the preliminary oxidation is not particularly limited, in the case that the Cr vaporization inhibition is achieved.

EXAMPLES

Hereinafter, the results of examples of the present invention will be describe

[First Aspect]

In the following examples, ferritic stainless steels having the component formulations shown in Table 1 were melted and subjected to a hot rolling, an annealing-acid washing, and a cold rolling, and then subjected to a bright annealing or a final annealing-acid washing, to form a cold rolled steel plate having a thickness of 0.6 mm to 1.2 mm. In Table 1 and Table 2, the value beyond the range disclosed in the First Aspect of the present invention was underlined.

sheet was subjected to the evaluation of the vaporizability of Cr in the reformed gas environment. The reformed gas environment was assumed to be similar to the atmosphere to which steel is exposed in a reforming device of the fuel cell, the reformed gas environment had the atmosphere composed of 26 vol % of $H_2O$+7 vol % of $CO_2$+7 vol % of CO–60 vol

TABLE 1

| Steel | Component Formulation (mass %) | | | | | | | | | |
|---|---|---|---|---|---|---|---|---|---|---|
| | C | Si | Mn | P | S | Cr | Ti | Al | N | Other Elements |
| 1-A | 0.028 | 0.18 | 0.15 | 0.030 | 0.0090 | 24.2 | 0.250 | 1.20 | 0.025 | |
| 1-B | 0.008 | 0.85 | 0.25 | 0.019 | 0.0003 | 17.2 | 0.050 | 1.90 | 0.011 | |
| 1-C | 0.011 | 1.80 | 0.30 | 0.025 | 0.0008 | 18.2 | 0.150 | 0.80 | 0.010 | Sb: 0.08, Nb: 0.18, V: 0.2, Co: 0.1 |
| 1-D | 0.006 | 0.45 | 0.21 | 0.019 | 0.0006 | 17.9 | 0.170 | 1.90 | 0.006 | Ga: 0.0015, La: 0.01, REM: 0.01 |
| 1-E | 0.003 | 1.10 | 0.30 | 0.035 | 0.0003 | 11.5 | 0.006 | 3.40 | 0.010 | Ga: 0.002, Mg: 0.002, Sn: 0.02 |
| 1-F | 0.005 | 0.90 | 1.80 | 0.027 | 0.0019 | 13.4 | 0.380 | 1.50 | 0.012 | Mg: 0.005, B: 0.005, Ca: 0.003 |
| 1-G | 0.015 | 0.55 | 0.35 | 0.025 | 0.0002 | 19.2 | 0.150 | 1.60 | 0.015 | Ni: 0.35, Cu: 0.45, Nb: 0.25, Mg: 0.001, Ga: 0.001 |
| 1-H | 0.013 | 0.45 | 0.25 | 0.012 | 0.0005 | 18.1 | 0.120 | 3.10 | 0.015 | W: 0.1, Ga: 0.004, Mg: 0.0011 |
| 1-I | 0.008 | 0.11 | 0.55 | 0.028 | 0.0007 | 22.2 | 0.180 | 1.90 | 0.013 | Mo: 1.2, Zr: 0.01, Hf: 0.02, Y: 0.01, Ga: 0.002 |
| 1-J | 0.004 | 0.25 | 0.14 | 0.022 | 0.0007 | <u>10.6</u> | 0.110 | 0.90 | 0.010 | Mg: 0.001, Sn: 0.02 |
| 1-K | 0.015 | 0.32 | <u>2.20</u> | 0.020 | 0.0007 | 16.3 | 0.150 | 1.20 | 0.016 | |
| 1-L | 0.011 | 0.36 | 0.20 | 0.020 | <u>0.0105</u> | 16.2 | 0.110 | 1.10 | 0.015 | |
| 1-M | <u>0.033</u> | 0.35 | 0.35 | 0.030 | 0.0007 | 13.2 | 0.090 | 0.90 | <u>0.031</u> | Ga: 0.002, Sb: 0.01 |
| 1-N | 0.025 | 0.25 | 0.35 | 0.030 | 0.0007 | <u>25.4</u> | 0.095 | 0.65 | 0.025 | Nb: 0.25 |
| 1-O | 0.012 | 0.38 | 0.32 | 0.021 | 0.0005 | 17.5 | 0.150 | <u>0.45</u> | 0.011 | |
| 1-P | 0.009 | 0.42 | 0.25 | 0.019 | 0.0003 | 16.2 | <u>1.05</u> | 0.80 | 0.012 | |

The bright annealing was performed in an atmosphere containing 50 vol % to 100 vol % of hydrogen gas and a balance composed of nitrogen gas and less than 1 vol % of other gas, at a temperature of 600° C. to 1050° C. and at a dew point in the atmosphere gas of −45° C. to −55° C. The heating time was 1 to 3 minutes. In the case performed in a batch furnace, the heating time was 600 minutes. The test steel plate was subjected to the preliminary oxidation in the air, at 850° C., in 100 h, as needed, to verify the Cr vaporization inhibition effect of the compositions in the depth direction region having twice the thickness of the oxide film. Regarding the depth direction region having twice the thickness of the oxide film in the test steel plate, each element profile of detected element from the surface of the test steel plate was determined by the GDS to obtain the thickness and the composition thereof. As is explained above, the film thickness was the half-value width of O and the maximal concentrations of Ti and Al were the values converted in cation ion fraction.

A sample of 30 mm×30 mm was cut from each ferritic stainless steel plate, and the sample provided on the alumina % of $H_2$, and the atmosphere was heated to a temperature of 650° C., maintained thereat for 1000 hours, and cooled to room temperature. The Cr oxide deposited on the alumina sheet was visually confirmed, and then, the Cr oxide was distilled in 100 ml of the solvent and the amount of Cr was determined by the inductively coupled plasma atomic emission spectroscopy (ICP-AES). When the vaporizability of Cr was determined, cases in which Cr oxide was deposited on the alumina sheet were visually confirmed and the Cr concentration was determined to be more than 0.01 mg/100 ml by ICP-AES are marked with a "C". Cases in which Cr oxide deposition on the alumina sheet were not visually confirmed and the Cr concentration was determined to be 0.01 mg/100 ml or less by ICP-AES is marked with a "B". Cases in which the Cr concentration was determined to be 0.001 mg/100 ml or less by ICP-AES are marked with an "A". The Cr vaporization inhibition effect of the present invention was obtained in cases of "B" and "A".

TABLE 2

| | | Bright annealing | | | | Depth direction region having twice thickness of oxide film | | | | |
|---|---|---|---|---|---|---|---|---|---|---|
| | | | | | | | Maximal concentration (mass %) | | | |
| No. | Steel | $H_2$ gas (%) | Temperature (° C.) | Time (min) | Preliminary oxidation | Thickness (µm) | Ti | Al | Vaporizability of Cr | Notes |
| 1-1 | 1-A | 90 | 1050 | 3 | Not executed | 0.015 | 30 | 60 | A | Example |
| 1-2 | 1-B | 100 | 700 | 600 | Not executed | 0.006 | 5 | 35 | B | Example |
| 1-3 | | 80 | 920 | 2 | Not executed | 0.012 | 1 | 40 | B | Example |
| 1-4 | | — | — | — | — | 0.004 | 5 | 5 | C | Comparative Example |

TABLE 2-continued

| | | Bright annealing | | | | Depth direction region having twice thickness of oxide film | | | |
|---|---|---|---|---|---|---|---|---|---|
| | | | | | | | Maximal concentration (mass %) | | |
| No. | Steel | H₂ gas (%) | Temperature (° C.) | Time (min) | Preliminary oxidation | Thickness (μm) | Ti | Al | Vaporizability of Cr | Notes |
| 1-5 | 1-C | 100 | 700 | 600 | Not executed | 0.008 | 15 | 45 | B | Example |
| 1-6 | | 80 | 980 | 2 | Not executed | 0.015 | 20 | 45 | B | Example |
| 1-7 | 1-D | 95 | 920 | 1 | Not executed | 0.008 | 7 | 65 | A | Example |
| 1-8 | | 95 | 920 | 1 | Executed | 0.100 | 35 | 65 | A | Example |
| 1-9 | | — | — | — | Executed | 0.195 | 45 | 75 | A | Example |
| 1-10 | 1-E | 55 | 850 | 2 | Not executed | 0.015 | — | 65 | A | Example |
| 1-11 | 1-F | 75 | 880 | 1 | Not executed | 0.020 | 55 | 45 | A | Example |
| 1-12 | 1-G | — | — | — | Executed | 0.160 | 20 | 60 | A | Example |
| 1-13 | 1-H | 80 | 950 | 2 | Not executed | 0.010 | 10 | 75 | A | Example |
| 1-14 | 1-I | 80 | 1020 | 1 | Not executed | 0.010 | 25 | 50 | A | Example |
| 1-15 | 1-J | — | — | — | Executed | 0.30 | 10 | 15 | C | Comparative Example |
| 1-16 | 1-K | 80 | 900 | 2 | Not executed | 0.20 | 2 | 25 | C | Comparative Example |
| 1-17 | 1-L | — | — | — | Executed | 0.30 | 10 | 25 | C | Comparative Example |
| 1-18 | 1-M | 80 | 900 | 2 | Not executed | 0.016 | 2 | 20 | C | Comparative Example |
| 1-19 | 1-N | 80 | 1050 | 2 | Not executed | 0.015 | 10 | 30 | C | Comparative Example |
| 1-20 | 1-O | 75 | 950 | 1 | Not executed | 0.016 | 30 | 25 | C | Comparative Example |
| 1-21 | 1-P | 75 | 950 | 1 | Not executed | 0.017 | 75 | 10 | C | Comparative Example |

Note 1:
In the bright annealing, "—" means the test in which the bright annealing was not performed.
Note 2:
In the Vaporizability of Cr, A: the Cr concentration was determined to be 0.001 mg/100 ml or less by ICP-AES (lower detection limit), B: the Cr oxide deposited on the alumina sheet was not visually confirmed and the Cr concentration was determined to be 0.01 mg/100 ml or less by ICP-AES, and C: the Cr oxide deposited on the alumina sheet was visually confirmed and the Cr concentration was determined to be more than 0.01 mg/100 ml by ICP-AES.

The evaluation results are shown in Table 2. In Nos. 1-1 to 1-3, 1-5 to 1-14, the test steel plate satisfied the composition determined in the First Aspect of the present invention and the surface composition in an depth direction region having twice a thickness of an oxide film, and the Cr vaporization inhibition effect which is the object of the First Aspect of the present invention was achieved in the reformed gas environment. In Nos. 1-1, 1-7, 1-8, and 1-9, the amounts of Al and Ti were in the preferably range, the concentrations of Ti and Al in the oxide film or in the surface of the stainless steel immediately beneath the oxide film was improved to the preferably range of the First Aspect of the present invention by the bright annealing, the preliminary oxidation, or the both thereof, the Cr vaporization inhibition effect was remarkable, as a result, the evaluation was "A". In No. 1-10, the amount of Ti did not satisfy the preferably range; however, the Cr vaporization inhibition effect was shown by the effect of Ga, Mg, and Sn in the small amount, and as a result, the evaluation was "A". In Nos. 1-2 to 1-3 and 1-5 to 1-6, the concentration of Al in the oxide film or in the surface of the stainless steel immediately beneath the oxide film was improved to the target value or in the preferably range of the First Aspect of the present invention by the bright annealing or the preliminary oxidation, the Cr vaporization inhibition effect was obtained, and as a result, the evaluation was "B".

In No. 1-4, the test steel plate satisfied the composition determined in the First Aspect of the present invention, however, the bright annealing and the preliminary oxidation were not performed. Therefore, the surface composition in the oxide film or in the surface of the stainless steel immediately beneath the oxide film did not satisfied the value determined in the First Aspect of the present invention, as a result, the Cr vaporization inhibition effect was not obtained.

In Nos. 1-15 to 1-21, since the test steel plate did not satisfied the composition determined in the First Aspect of the present invention, when the bright annealing or the preliminary oxidation were performed, the surface composition was not satisfied or the evaluation was "C" in the case that the surface composition satisfied the value of the First Aspect of the present invention. In No. 1-15, a Fe film was formed, since the amount of Ce was low; in No. 1-16, a Mn film was formed, since the amount of Mn was high; and in No. 1-17, the thickness of the film was 0.1 μm or more, since the protection performance lacked a high amount of S.

Figure 1:
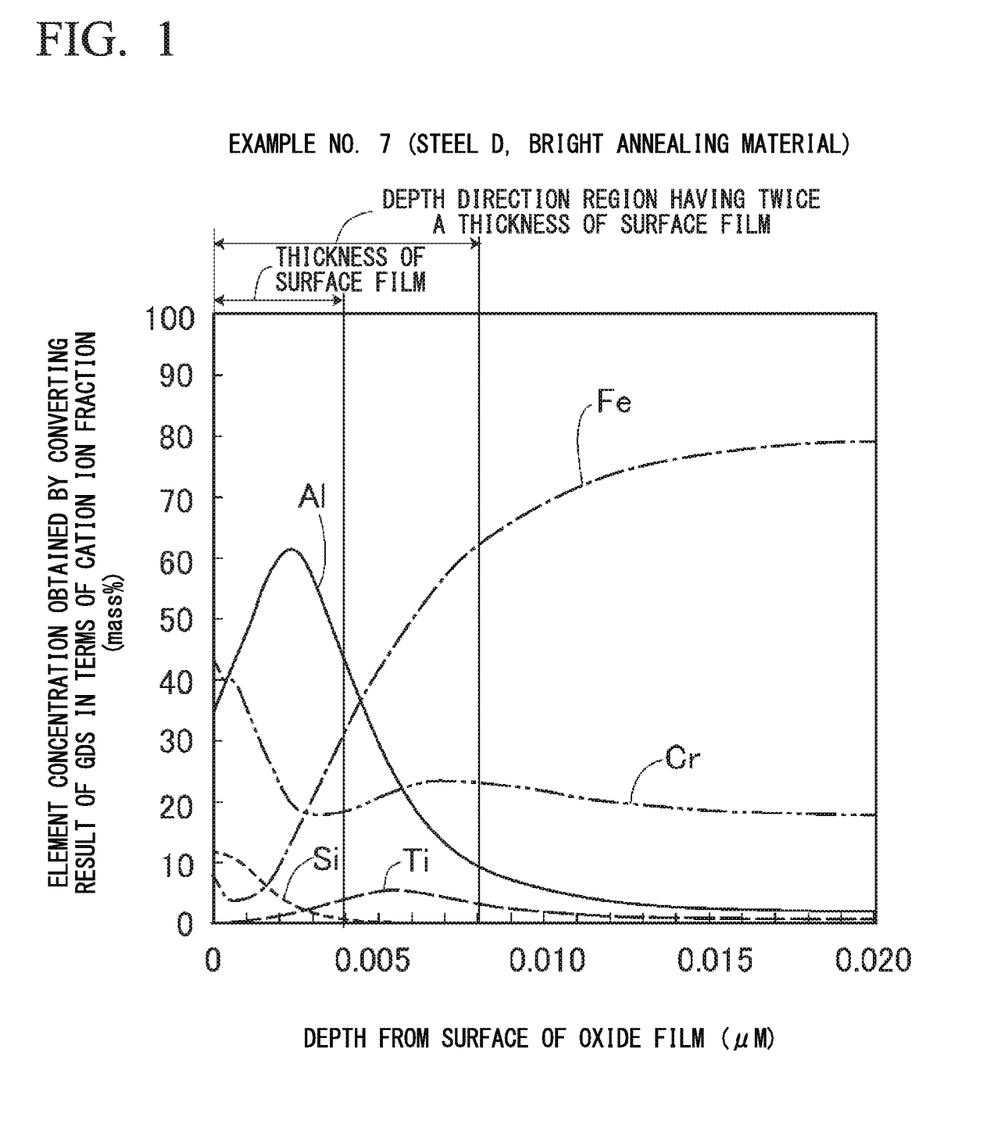
FIG. 1 is a graph showing elemental profiles in terms of cation ion fraction excepting O and C in an depth direction, obtained by analyzing surface compositions of bright annealing materials of Example No. 1-7 in Table 2 using GDS.
Figure 2:
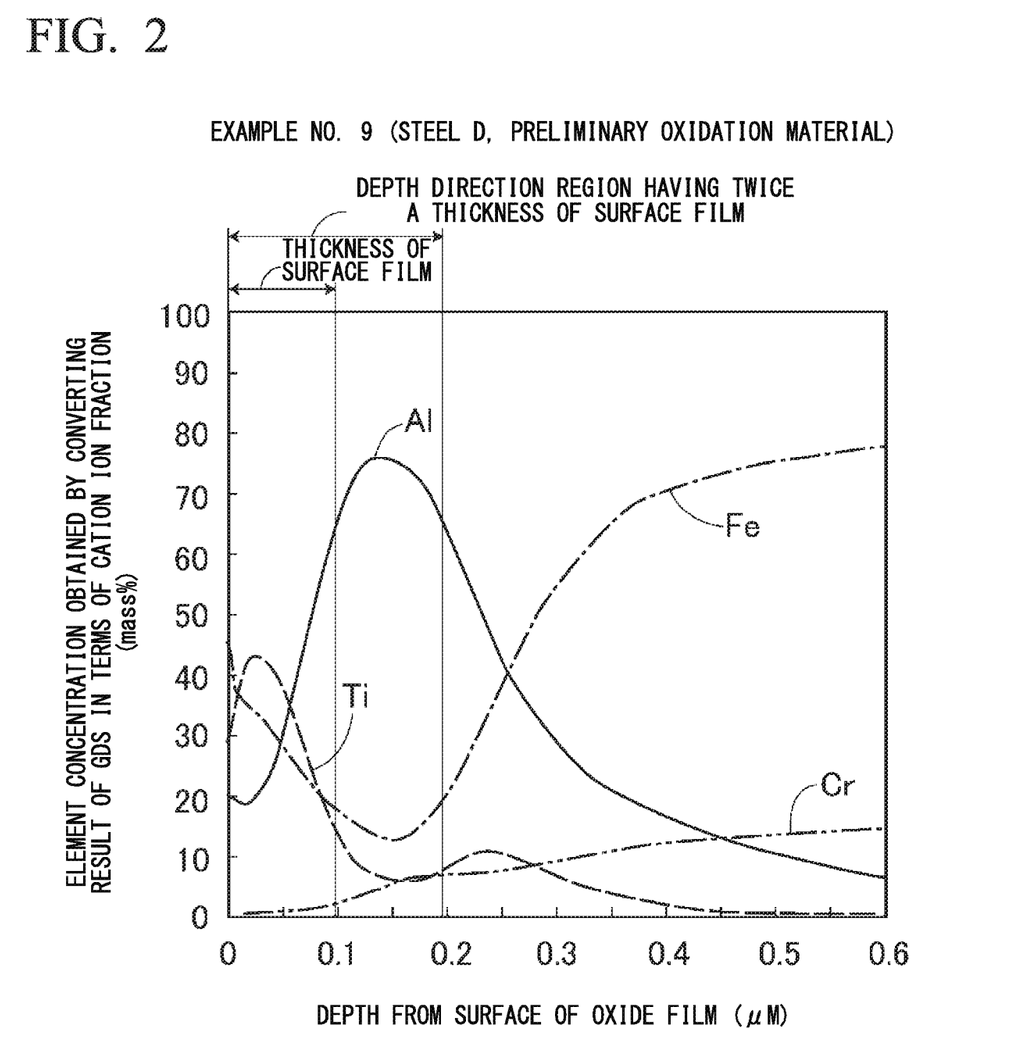
FIG. 2 is a graph showing elemental profiles in terms of cation ion fraction excepting O and C in an depth direction, obtained by analyzing surface compositions of Example No. 1-9 in Table 2 after a preliminary oxidation using GDS.

Regarding to the Example No. 1-7, elemental profiles of cation ion in a depth direction from the surface of the bright annealing materials determined by GDS was shown in FIG. 1. As a result, the fact that the test steel had the compositions determined in the First Aspect of the present invention, Ti and Al were concentrated on the oxide film or on the surface of the stainless steel immediately beneath the oxide film by the bright annealing was confirmed. Regarding Example No. 1-9, elemental profiles of cation ions in a depth direction from the surface after the preliminary oxidation treatment determined by GDS are shown in FIG. 2. As a result, the fact that the test steel had the compositions determined in the First Aspect of the present invention, and the concentrated Ti and Al in the oxide film or in the surface of the stainless steel immediately beneath the oxide film was promoted by the preliminary oxidation treatment was confirmed.

[Second Aspect]

In the following examples, ferritic stainless steels having the component formulations shown in Table 3 were melted and subjected to a hot rolling, an annealing-acid washing, and a cold rolling, and then subjected to a final annealing-acid washing, a bright annealing or a preliminary oxidation, to form a cold rolled steel plate having a thickness of 0.6 mm to 1.2 mm. In Table 3, the value beyond the range disclosed in the Second Aspect of the present invention was underlined. In Table 3, the case that the amount of Ga, Mg, or Zn was 0.0003% or less, these elements were not added intentionally, and these elements were included as unavoidable impurities.

TABLE 3

| | Component Formulation (mass %) | | | | | | | | | | | | | |
|---|---|---|---|---|---|---|---|---|---|---|---|---|---|---|
| Steel | C | Si | Mn | P | S | Cr | Ti | Al | N | Ga | Mg | Zn | Formula 1 | Other Elements |
| 2-A | 0.028 | 0.18 | 0.15 | 0.030 | 0.0080 | 24.2 | 0.050 | 1.20 | 0.025 | 0.0030 | 0.0005 | 0.0050 | 0.0085 | |
| 2-B | 0.028 | 0.19 | 0.15 | 0.028 | 0.0079 | 24.1 | 0.050 | 1.20 | 0.025 | 0.0005 | 0.0002 | 0.0001 | 0.0008 | |
| 2-C | 0.011 | 1.80 | 0.30 | 0.025 | 0.0008 | 18.2 | 0.150 | 0.80 | 0.010 | 0.0002 | 0.0002 | 0.0060 | 0.0064 | Sb: 0.08, Nb: 0.18, V: 0.2, Co: 0.1 |
| 2-D | 0.006 | 0.45 | 0.21 | 0.019 | 0.0006 | 17.9 | 0.170 | 1.90 | 0.006 | 0.0020 | 0.0020 | 0.0005 | 0.0045 | Sn: 0.02, Sb: 0.01 |
| 2-E | 0.003 | 1.10 | 0.30 | 0.035 | 0.0003 | 11.5 | 0.006 | 3.40 | 0.010 | 0.0003 | 0.0010 | 0.0015 | 0.0028 | La: 0.01, REM: 0.01 |
| 2-F | 0.005 | 0.90 | 1.20 | 0.027 | 0.0019 | 13.4 | 0.380 | 1.30 | 0.012 | 0.0050 | 0.0002 | 0.0008 | 0.0060 | B: 0.005, Ca: 0.003 |
| 2-G | 0.015 | 0.55 | 0.35 | 0.025 | 0.0002 | 19.2 | 0.150 | 1.70 | 0.015 | 0.0003 | 0.0025 | 0.0001 | 0.0029 | Ni: 0.35, Cu: 0.45, Nb: 0.25 |
| 2-H | 0.013 | 0.45 | 0.25 | 0.012 | 0.0005 | 18.1 | 0.120 | 3.10 | 0.015 | 0.0040 | 0.0090 | 0.0003 | 0.0133 | W: 0.1 |
| 2-I | 0.008 | 0.11 | 0.55 | 0.028 | 0.0007 | 22.2 | 0.180 | 1.90 | 0.013 | 0.0020 | 0.0003 | 0.0002 | 0.0025 | Mo: 1.2, Zr: 0.01, Hf: 0.02, Y: 0.01 |
| 2-J | 0.004 | 0.25 | 0.14 | 0.022 | 0.0007 | 10.6 | 0.110 | 0.90 | 0.010 | 0.0002 | 0.0010 | 0.0001 | 0.0013 | Sn: 0.02 |
| 2-K | 0.015 | 0.32 | 2.20 | 0.020 | 0.0007 | 16.3 | 0.150 | 1.20 | 0.016 | 0.0002 | 0.0002 | 0.0002 | 0.0006 | |
| 2-L | 0.011 | 0.36 | 0.20 | 0.020 | 0.0110 | 16.2 | 0.110 | 1.10 | 0.015 | 0.0002 | 0.0002 | 0.0003 | 0.0007 | |
| 2-M | 0.033 | 0.35 | 0.35 | 0.030 | 0.0007 | 13.2 | 0.090 | 0.90 | 0.031 | 0.0020 | 0.0002 | 0.0003 | 0.0025 | Sb: 0.01 |
| 2-N | 0.025 | 0.25 | 0.35 | 0.030 | 0.0007 | 25.4 | 0.095 | 0.65 | 0.025 | 0.0002 | 0.0002 | 0.0002 | 0.0006 | Nb: 0.25 |
| 2-O | 0.012 | 0.38 | 0.32 | 0.021 | 0.0005 | 17.5 | 0.150 | 0.45 | 0.011 | 0.0012 | 0.0008 | 0.0001 | 0.0021 | |
| 2-P | 0.009 | 0.42 | 0.25 | 0.019 | 0.0003 | 16.2 | 0.550 | 0.80 | 0.012 | 0.0010 | 0.0012 | 0.0001 | 0.0023 | |

Formula 1: Ga + Mg + Zn

TABLE 4

| | | Heating conditions | | | Quality | |
|---|---|---|---|---|---|---|
| No | Steel | annealing-acid washing | Bright annealing | Preliminary oxidation | Vaporizability of Cr | Notes |
| 2-1 | 2-A | Executed | — | — | B | Example |
| 2-2 | 2-B | Executed | — | — | C | Comparative Example |
| 2-3 | 2-C | — | Executed | — | B | Example |
| 2-4 | 2-D | Executed | — | Executed | A | Example |
| 2-5 | | Executed | — | — | A | Example |
| 2-6 | 2-E | — | Executed | — | B | Example |
| 2-7 | 2-F | — | Executed | — | A | Example |
| 2-8 | 2-G | Executed | — | Executed | A | Example |
| 2-9 | 2-H | — | Executed | — | A | Example |
| 2-10 | 2-I | — | Executed | — | B | Example |
| 2-11 | 2-J | Executed | — | Executed | C | Comparative Example |
| 2-12 | 2-K | — | Executed | — | C | Comparative Example |
| 2-13 | 2-L | Executed | — | Executed | C | Comparative Example |
| 2-14 | 2-M | — | Executed | — | C | Comparative Example |
| 2-15 | 2-N | — | Executed | — | C | Comparative Example |
| 2-16 | 2-O | — | Executed | — | C | Comparative Example |
| 2-17 | 2-P | — | Executed | — | C | Comparative Example |

Note 1:
In the heating conditions, "—" means the test was not performed and "Executed" means the test was performed.
Note 2:
In the Vaporizability of Cr, A: the Cr concentration was determined to be 0.001 mg/100 ml or less by ICP-AES (lower detection limit), B: the Cr oxide deposited on the alumina sheet was not visually confirmed and the Cr concentration was determined to be 1.01 mg/100 ml or less by ICP-AES, and C: the Cr oxide deposited on the alumina sheet was visually confirmed and the Cr concentration was determined to be more than 0.01 mg/100 ml by ICP-AES.

In Table 4, when the annealing-acid washing is indicated as "Executed", in the final annealing-acid washing, the heating treatment was performed in a LNG combustion exhaust gas atmosphere including oxygen, at a temperature of 700° C. to 1050° C., in 0.5 to 3 minutes and then a nitrogen electrolysis was performed after an acid washing descaling. The acid washing descaling was performed by immersing the test steel plate in an alkali salt at a temperature of 430° C. and immersing the test steel plate in 5% of nitric acid-0.5% of nitric-hydrofluoric acid at a temperature of 55° C. The nitrogen electrolysis was performed in 10% of nitric acid aqueous solution. In Table 4, when the bright annealing is indicated as "Executed", the bright annealing was performed by heating the test steel plate in an atmosphere containing 80 vol % of hydrogen and a balance substantially composed of nitrogen gas, at a temperature of 700° C. to 1050° C., in 1 to 3 minutes. In Table 4, when the preliminary oxidation is indicated as "Executed", the preliminary oxidation was performed in air, at a temperature of 850° C. in 100 h.

A sample of 30 mm×30 mm was cut from each ferritic stainless steel plate, and the sample provided on the alumina sheet was subjected to the evaluation of the vaporizability of Cr in the reformed gas environment. The evaluating method and the evaluation criterion were the same as shown in the First Aspect of the present invention. The Cr vaporization inhibition effect of the present invention was obtained in the cases of "B" and "A".

The evaluation results are shown in Table 4. In Nos. 2-1, and 2-3 to 2-10, the test steel plate satisfied the composition determined in the Second Aspect of the present invention and the method for producing the ferritic stainless steels disclosed in the Second Aspect of the present invention, and the Cr vaporization inhibition effect which is the object of the Second Aspect of the present invention was achieved in the reformed gas environment, as a result, the evaluation was "B" or "A". Specifically, in Nos. 2-4, 2-5, 2-7, 2-8, and 2-9, the amount of Si, Al, and Ti were in the preferably range, and the test steel was subjected to the method disclosed in the Second Aspect, and the Cr vaporization inhibition effect was remarkable, and as a result, the evaluation was "A".

In Nos. 2-2 and 2-11 to 2-17, since the test steel plate did not satisfied the composition determined in the Second Aspect of the present invention, when the bright annealing or the preliminary oxidation were performed, the resistance to Cr vaporizing was not obtained, and as a result, the evaluation was "C".

INDUSTRIAL APPLICABILITY

By the first aspect of the present invention, the ferritic stainless steel, which having both a high oxidation resistance under reformed gas and an effect of Cr vaporization inhibition, can be provided for a fuel cell, without relying on an excessive additions of Al and Si, preparations of trace element, and a preliminary oxidation. That is, the ferritic stainless steel in the first aspect of the present invention can be industrially produced without using any special method.

By the second aspect of the present invention, the ferritic stainless steel, which having both a high oxidation resistance under reformed gas and an effect of Cr vaporization inhibition, can be provided for a fuel cell, without relying on an excessive additions of Al and Si and a preliminary oxidation. That is, the ferritic stainless steel in the second aspect of the present invention can be industrially produced without using any special method.

The invention claimed is:
1. A ferritic stainless steel for a fuel cell comprising, in mass %, Cr: 11 to 25%, C: 0.03% or less, Si: 2% or less, Mn: 2% or less, Al: 0.5 to 4.0%, P: 0.05% or less, S: 0.01% or less, N: 0.03% or less, Ti: 1% or less, and a balance composed of Fe and unavoidable impurities, wherein,
a maximal concentration of Al in a surface of the ferritic stainless steel is 30 mass % or more in cation ion fraction excepting O in an depth direction region having twice a thickness of an oxide film having less than 0.1 μm, and
a maximal concentration of Ti in a surface of the ferritic stainless steel is 3 mass % or more and 60 mass % or less in cation ion fraction excepting O.
2. The ferritic stainless steel for a fuel cell according to claim 1, further comprising, in mass %, one or two or more of elements selected from a group consisting of Ni: 1% or less, Cu: 1% or less, Mo: 2% or less, Sn: 1% or less, Sb: 1% or less, W: 1% or less, Co: 0.5% or less, Nb: 0.5% or less, V: 0.5% or less, Zr: 0.5% or less, Ga: 0.1% or less, Mg: 0.01% or less, B: 0.005% or less, Ca: 0.005% or less, Y: 0.1% or less, Hf: 0.1% or less, and REM: 0.1% or less, wherein the REM is an element in atomic numbers 57 to 71.
3. A method for producing the ferritic stainless steel for a fuel cell according to claim 2, the method comprising:
a heating step of heating the ferritic stainless steel having a composition of the ferritic stainless steel, in an atmosphere containing oxygen or hydrogen at a temperature of 700 to 1100° C., to form an oxide film on a surface of the ferritic stainless steel.
4. A method for producing the ferritic stainless steel for a fuel cell according to claim 1, the method comprising:
a heating step of heating the ferritic stainless steel having a composition of the ferritic stainless steel, in an atmosphere containing oxygen or hydrogen at a temperature of 700 to 1100° C., to form an oxide film on a surface of the ferritic stainless steel.
5. A ferritic stainless steel for a fuel cell comprising, in mass %, Cr: 11 to 25%, C: 0.03% or less, Si: 2% or less, Mn: 2% or less, Al: 0.5 to 4.0%, P: 0.05% or less, S: 0.01% or less, N: 0.03% or less, Ti: 1% or less, and a balance composed of Fe and unavoidable impurities, wherein,
a maximal concentration of Al in a surface of the ferritic stainless steel is 30 mass % or more in cation ion fraction excepting O in an depth direction region having twice a thickness of an oxide film having less than 0.1 μm, after heating the ferritic stainless steel in an atmosphere containing 50 vol % or more of hydrogen gas and a balance substantively composed of nitrogen gas at a temperature of 800 to 1000° C. within 10 minutes or less and cooling thereof to room temperature, and
a maximal concentration of Ti in a surface of the ferritic stainless steel is 3 mass % or more and 60 mass % or less in cation ion fraction excepting O.
6. The ferritic stainless steel for a fuel cell according to claim 5, further comprising, in mass %, one or two or more of elements selected from a group consisting of Ni: 1% or less, Cu: 1% or less, Mo: 2% or less, Sn: 1% or less, Sb: 1% or less, W: 1% or less, Co: 0.5% or less, Nb: 0.5% or less, V: 0.5% or less, Zr: 0.5% or less, Ga: 0.1% or less, Mg: 0.01% or less, B: 0.005% or less, Ca: 0.005% or less, Y: 0.1% or less, Hf: 0.1% or less, and REM: 0.1% or less, wherein the REM is an element in atomic numbers 57 to 71.
7. A ferritic stainless steel for a fuel cell comprising, in mass %, Cr: 11 to 25%, C: 0.03% or less, Si: 2% or less, Mn: 2% or less, Al: 0.5 to 4.0%, P: 0.05% or less, S: 0.01% or less, N: 0.03% or less, Ti: 1% or less, and a balance composed of Fe and unavoidable impurities, wherein, a maximal concentration of Al in a surface of the ferritic stainless steel is 30 mass % or more in cation ion fraction excepting O in an depth direction region having twice a thickness of an oxide film having less than 0.1 μm, after heating the ferritic stainless steel in an atmosphere of air at a temperature of 850° C. for 100 hours and cooling thereof to room temperature, and a maximal concentration of Ti in a surface of the ferritic stainless steel is 3 mass % or more and 60 mass % or less in cation ion fraction excepting O.

8. The ferritic stainless steel for a fuel cell according to claim 7, further comprising, in mass %, one or two or more of elements selected from a group consisting of Ni: 1% or less, Cu: 1% or less, Mo: 2% or less, Sn: 1% or less, Sb: 1% or less, W: 1% or less, Co: 0.5% or less, Nb: 0.5% or less, V: 0.5% or less, Zr: 0.5% or less, Ga: 0.1% or less, Mg: 0.01% or less, B: 0.005% or less, Ca: 0.005% or less, Y: 0.1% or less, Hf: 0.1% or less, and REM: 0.1% or less, wherein the REM is an element in atomic numbers 57 to 71.

* * * * *